UNITED STATES PATENT OFFICE.

THOMAS J. GORDON AND DELOS H. BUMPUS, OF ROUSEVILLE, PA.

IMPROVEMENT IN PROCESSES FOR MANUFACTURING LUBRICATING OILS.

Specification forming part of Letters Patent No. 162,377, dated April 20, 1875; application filed September 26, 1874.

*To all whom it may concern:*

Be it known that we, THOMAS J. GORDON and DELOS H. BUMPUS, of Rouseville, Venango county, Pennsylvania, have invented a new and Improved Process for Manufacturing Lubricating-Oil, of which the following is a specification:

The object of our invention is to decolorize and refine crude petroleum, in the manufacture of lubricating or other oils, by passing such crude petroleum through clay, or clay and sand, which has been previously pulverized and rendered anhydrous, as hereinafter set forth.

In decolorizing and refining crude petroleum, we proceed substantially as follows: We take any clay, always preferring, however, clay which contains the largest percentum of alumina, and which is freest of vegetable matter. This clay we first render anhydrous by the application of heat. When this is effected we pulverize the clay, and lightly pack it in a filtering-vessel made of wood, iron, tin, or any suitable material, in any suitable form and height, with a perforated bottom. The filtering-vessel is thus packed with the clay to the depth of six, eight, ten, or twelve inches, according to the quantity and gravity of the crude petroleum to be filtered. The crude petroleum is then poured over the clay, or clay and sand, to the depth of five or six inches. The feeding of the filterer by thus pouring in the crude petroleum is continued from time to time as the filter discharges the refined oil, until the filtered oil begins to assume a darker color, when the filter is emptied and filled with new filtering material. The petroleum, which thus transfuses through the filtering material, is of light color, and is divested, in a large degree, of the odor of the crude petroleum. During the progress of the filtration the filtering material is kept at a temperature of not less than sixty degrees (60°) Fahrenheit. This is accomplished by sustaining such temperature in the room where the filtration is progressing, or by passing a flow of steam by means of pipes through the filterer, or by passing steam into a jacket surrounding the filterer, or by any other suitable means.

The decolorization of the crude petroleum is effected in our process through the chemical affinity of the alumina in the clay with the coloring matter in the crude petroleum, and this chemical affinity can only be induced by bringing the particles of coloring matter in intimate contact with the particles of alumina, and this can only effectively occur where the clay has been previously rendered anhydrous and pulverized, as hereinabove substantially set forth and described.

We are aware that clay has been used in the arts as a mordant; we are also aware that it has been used, either alone or with sand, as a medium for filtration, but we believe that its employment as a medium for the filtration of petroleum, under the conditions and in recognition of the chemical laws whereby we employ it, is entirely new.

We treat and manipulate the clay for the purpose of producing anhydrous alumina; we recognize in this anhydrous pulverized alumina the potential union with the coloring matter of the crude petroleum; and herein, we believe, is the novelty of our invention.

By using dry sand with the clay, a red or darker colored oil may be procured, free from impurities. We therefore include this mixture in our specification.

Having thus described our invention, we claim as new and desire to secure by Letters Patent—

The within-described process of decolorizing and refining petroleum by filtration through anhydrous pulverized clay, or anhydrous pulverized clay and sand, substantially as described.

THOMAS J. GORDON.
DELOS H. BUMPUS.

Witnesses:
R. C. BEVERIDGE,
WILLIAM SCHAGE.